March 23, 1954 W. J. BATTELL ET AL 2,673,294
DISCRIMINATOR CIRCUIT
Filed Oct. 17, 1951
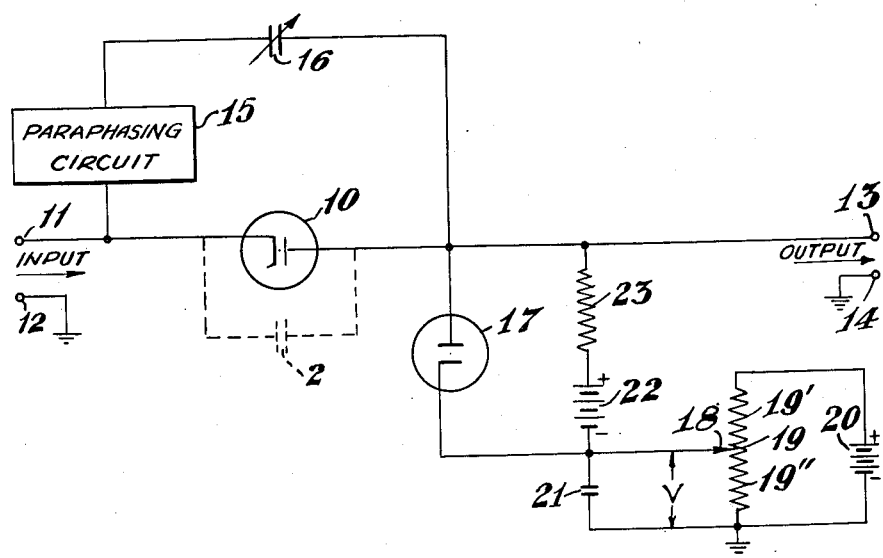
INVENTOR
WILLIAM J. BATTELL
NORMAN F. MOODY
BY Smart & Biggar
ATTORNEYS Patented Mar. 23, 1954

2,673,294

UNITED STATES PATENT OFFICE 2,673,294

DISCRIMINATOR CIRCUIT

William J. Battell, Deep River, Ontario, Canada, and Norman F. Moody, London, England, assignors to National Research Council, Ottawa, Ontario, Canada, a body corporate of Canada Application October 17, 1951, Serial No. 251,666

Claims priority, application Canada August 10, 1951

2 Claims. (Cl. 250—27)

1

The invention relates to an improved discriminator circuit and is concerned with the type for which discrimination is obtained by means of a biased unilateral conduction device.

Previously known discriminator circuits have been found satisfactory for many uses but have serious shortcomings when used in applications requiring a high degree of accuracy, for example, in pulse amplitude analysers such as are used in nuclear measurements to sort and count pulses according to their amplitudes. A multi-channel pulse amplitude analyser usually has a series of discriminators each set to provide discrimination at a different level in an ascending scale. In one form of the instrument the discriminators are interconnected so that operation of one discriminator blocks operation of the discriminator set to provide discrimination at the next lower level in the scale. Each discriminator is connected to an output circuit which is arranged to record the number of pulses transmitted to it. In order that the results obtained be as accurate as possible, it is important to be able to set the level of each discriminator to a particular value and to have each discriminator remain substantially exactly at its set level during its life and during the voltage and current variations which occur in its circuits during the discrimination process.

In the present invention a discriminator is provided having a first unilateral conduction means connected to provide discrimination at a level set by a voltage derived from a potentiometer through a second unilateral conduction means. The current which determines the point of discrimination (that is, the point of transition from the so-called state of conduction to that of non-conduction or vice versa) is supplied by a power supply which is floating with respect to the voltage supplied by the potentiometer. This floating supply is connected to supply the current required through the second unilateral conduction means. Preferably, each unilateral conduction means is a diode, electron tube. The circuits connected to the output of the discriminator are high impedance.

Prior to discrimination taking place, in a discriminator according to the invention, the floating power supply circulates current through the second unilateral conduction device, the value of the current being set by the voltage of the power supply and the resistance of the load resistor. Upon discrimination occurring, this current is transferred to the first unilateral conduction device and flows through its input circuit

2 and back to the floating power supply through the potentiometer. According to the invention, possible variations in voltage due to the pulse current are eliminated by use of a large condenser connected to the slider of the potentiometer.

According to the invention it is preferred to use diode electron tubes as the first and second unilateral conduction means and to have the circuits so arranged that the contact potentials and the shunt susceptances of the diodes do not affect the point of discrimination. Preferably each diode is operated in its retarding field region, that is, in the region where the logarithm of the current is proportional to the impressed voltage. The point of discrimination is determined on the logarithmic transfer characteristic by defining a given current which the diode must exceed before it is in its so-called state of conduction.

A discriminator according to the invention has a high degree of stability and accuracy since the circuit whereby the current required by the discriminator to determine the conduction point is supplied from a source of power other than that used to set the voltage level of discrimination, this current thereby being independent of the voltage level. The pair of unilateral conduction means used is arranged so that the discriminator is substantially free of the effects of their contact potentials and, in a preferred form of the invention, a paraphasing circuit and condenser are connected in parallel with the first unilateral conduction means to cancel any signal transferred to the output connection through the input to output capacitance of the first unilateral conduction means. Another important advantage of a discriminator according to the invention, which in many applications may be one of a plurality of discriminators connected in parallel to the same low impedance source of input signal, is that it provides D. C. (direct current) coupling between its input circuit and its output circuit. Such coupling is essential in many instances, for example in the case of dealing with the wide range of pulse shapes and counting rates encountered in atomic energy applications. The circuits following the discriminator may be A. C. (alternating current) coupled since, in these circuits, D. C. levels are of no consequence.

The invention will be further described with reference to the accompanying drawing which shows the circuit of a discriminator according to the invention.

The circuit shown in the accompanying drawing comprises a unilateral conduction means 10, shown as a diode electron tube, having its cathode connected to an input terminal 11 and its anode connected to an output terminal 13. An input terminal 12 and an output terminal 14 are each connected to the ground return of the circuit. The input terminal 11 is also connected through a paraphasing circuit 15 (of which the construction is well known and therefore the circuit has been shown in block form) and a variable condenser 16 to the output terminal 13. The output terminal 13 is also connected to the anode of a second diode 17 which has its cathode connected to the tap connection 18 of a potentiometer 19. The potentiometer 19 is connected across a source of D. C. voltage shown as a battery 20 and one side of the potentiometer 19 as well as the negative side of the battery 20 are grounded. The tap connection 18 of the potentiometer 19 is connected to ground through a condenser 21 and is also connected through a power supply, shown as a battery 22, and a load resistor 23 to the output terminal 13. The input to output capacitance 24 of the diode 10 is indicated in dotted line.

As an example, suitable values for the components of the circuit are as follows:

| | |
|---|---|
| The input circuit D. C. datum voltage level between the input terminals 11 and 12. | +200 volts. |
| The input signal | negative going pulses. |
| Diodes 10 and 17 | Type EA50 or 6AL5 electron tubes. |
| Input to output capacitance of diode 10. | 2.5 $\mu\mu$f. |
| Capacitance of the condenser 16 | 1 to 4 $\mu\mu$f. |
| Resistance of the resistor 23 | 470,000 ohms. |
| Voltage of the battery 22 | 300 volts. |
| Capacitance of the condenser 21 | 4 $\mu\mu$f. |
| Total resistance of the potentiometer 19 (preferably a 15 turn helical potentiometer). | 100,000 ohms. |
| Voltage of the battery 20 | 200 volts. |

With the potentials given above, applied to the circuit, but without any input pulse, the setting of the tap connection 18 determines the voltage level of discrimination and this is indicated in the drawing as the voltage V. The diode 17 is conducting due to the voltage applied to it through the load resistor 23 by the battery 22 and current is circulating through the load resistor 23, the diode 17 and the battery 22. The voltage across the diode 17 under these conditions is determined by its contact potential and consequently the anode of the diode 17 is about 0.5 volt above the voltage V. If the diode 10 has the same value of contact potential, the effect of contact potential on the level of discriminations is cancelled and discrimination will commence at the voltage V. If a negative pulse is applied to the input terminals 11 and 12, the value of the D. C. datum voltage of the input circuit is reduced by the amount of the peak voltage of a pulse. If the voltage on the input terminal 11 is reduced to an amount greater than the voltage V, then the diode 10 will conduct and the potential of the output circuit 13 will be reduced to a value lower than V and the diode 17 will stop conducting. The current which was being circulated through the diode 17 by the battery 22 is now transferred to the diode 10 and flows through its input circuit and back to the battery 22 through the parts 19' and 19" of the potentiometer 19 and the tap connection 18. This current through the parts 19' and 19" of the potentiometer 19 tends to lower the voltage V but the charge stored in the large condenser 21 acts to maintain the tap connection 18 at the voltage V until the circuit is back to its steady state, when the condenser 21 is again charged from the tap connection 18. When the negative pulse applied to the input circuit allows the D. C. datum voltage of the input circuit to exceed the voltage V, the diode 10 is again cut off and the voltage of the output connection 13 rises to the voltage V.

The negative pulse applied to the paraphasing circuit 15 is converted into a positive pulse and applied to the output connection 13 through the variable condenser 16 of which the capacitance is adjusted as closely as possible to that of the input to output capacitance of the diode 10. The positive pulse transferred through the condenser 16 and the negative pulse transferred through the input to output capacitance of the diode 10 cancel each other in the output connection 13 and consequently there is no substantial effect on the output of the discriminator due to the input to output capacitance of the diode 10.

The circuit can be arranged for positive input pulses by reversing the connections to the diodes 10 and 17, to the battery 22, and by making the D. C. pulse datum level equal to zero.

In the case of the input consisting of fast pulses, for example of the order of 2000 volts/$\mu$ sec., known paraphasing circuits do not produce exactly the inverted signal, but introduce a slight delay in the build up of the initial pulse edge so that cancellation of the signal transferred through the input to output capacitance of the diode 10 is not complete. However, by increasing the current flowing through the resistor 23 almost to the end of the truly logarithmic portion of the diode characteristic, the effects of currents in the output circuit due to capacity transfer become negligible. Also, the sensitivity of the circuit connected to the output terminals can be made equal to about 0.2 volt, and the discriminator will function quite satisfactorily for input waveform rates as great as 2000 volts/$\mu$ sec.

What we claim as our invention is:

1. A discriminator for supplying an output signal into a high-impedance condenser-coupled circuit when an input signal consisting of voltage pulses passes a predetermined value of voltage with respect to a predetermined datum voltage level, said discriminator comprising a two terminal input connection, a two terminal output connection, a common connection between one terminal of the input connection and one terminal of the output connection, a first unilateral conduction means series connected between the other terminal of said input connection and the other terminal of said output connection in the polarity for conducting said input signal to said output connection, a first source of direct current voltage, a potentiometer connected across said first source of voltage and connected to said common connection, said potentiometer having a tap connection for supplying a voltage of said predetermined value, a condenser connected to said tap connection so as to be subject to said voltage of said predetermined value, a second unilateral conduction means series connected between said output connection and said tap connection of the potentiometer so as to conduct current in the same direction as said first unilateral conduction means with respect to said output connection, a second source of substantially constant direct current voltage, a load resistance, said second source of voltage and said load resistance being series connected in parallel with said second unilateral conduction means, and said second source of voltage being connected so as to cause current to flow from said second source of voltage through whichever unilateral conduction means is in a state of conduction.

2. A discriminator as defined in claim 1 comprising a paraphasing circuit and a condenser having a capacitance substantially equal to the capacitance existing across the first unilateral conduction means, said paraphasing circuit having its input connected to the input connection of said discriminator and its output connected in series with said condenser to the output connection of said discriminator.

WILLIAM J. BATTELL.
NORMAN F. MOODY.

References Cited in the file of this patent

UNITED STATES PATENTS

| Number | Name | Date |
|---|---|---|
| 2,422,976 | Nicholson, Jr. | June 24, 1947 |
| 2,500,839 | Lord | Mar. 14, 1950 |

FOREIGN PATENTS

| Number | Country | Date |
|---|---|---|
| 624,522 | Great Britain | June 10, 1949 |